United States Patent
Typpo

(10) Patent No.: US 7,345,772 B2
(45) Date of Patent: Mar. 18, 2008

(54) OPTICAL TRIANGULATION DEVICE AND METHOD OF MEASURING A VARIABLE OF A WEB USING THE DEVICE

(75) Inventor: Pekka Typpo, Cupertino, CA (US)

(73) Assignee: Voith Paper Patent GmbH, Heidenheim (DE)

( * ) Notice: Subject to any disclaimer, the term of this patent is extended or adjusted under 35 U.S.C. 154(b) by 408 days.

(21) Appl. No.: 10/912,090

(22) Filed: Aug. 6, 2004

(65) Prior Publication Data

US 2006/0028657 A1    Feb. 9, 2006

(51) Int. Cl.
*G01B 11/14* (2006.01)

(52) U.S. Cl. .................. 356/623; 356/624; 356/429
(58) Field of Classification Search ............... 356/614, 356/623, 624; 250/559.29, 559.31
See application file for complete search history.

(56) References Cited

U.S. PATENT DOCUMENTS

| | | | | | |
|---|---|---|---|---|---|
| 4,040,748 | A | * | 8/1977 | Belleson et al. | 356/431 |
| 4,065,212 | A | * | 12/1977 | Belleson et al. | 356/398 |
| 4,315,688 | A | * | 2/1982 | Pryor | 356/73 |
| 5,880,843 | A | * | 3/1999 | Hermosillo-Valadez et al. | 356/600 |
| 2006/0256229 | A1 | * | 11/2006 | Wernersson | 348/348 |

* cited by examiner

*Primary Examiner*—Roy M. Punnoose
(74) *Attorney, Agent, or Firm*—Greenblum & Bernstein, P.L.C.

(57) ABSTRACT

Device and method of measuring a position of an irregular surface. The method includes projecting a spot along a first axis onto the irregular surface, focusing an image of the spot along a second axis onto a detector, wherein the second axis is non-coaxially arranged with respect to the first axis, processing signals from the detector, and calculating the position of the irregular surface based on at least one isolated desired frequency component of the signals.

60 Claims, 5 Drawing Sheets

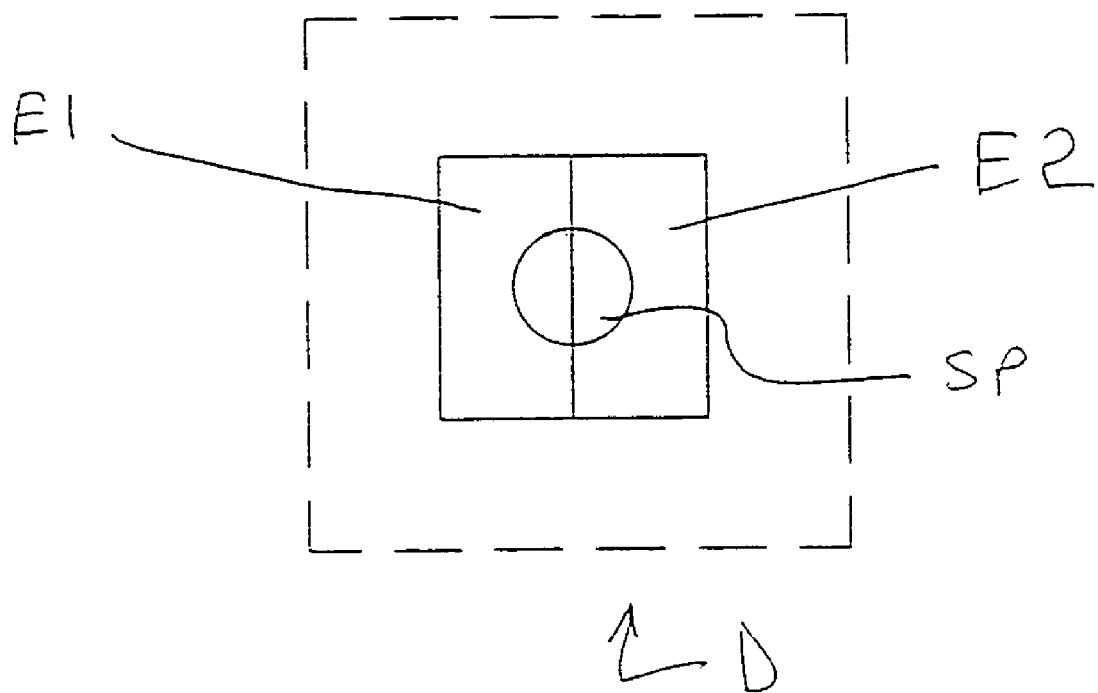

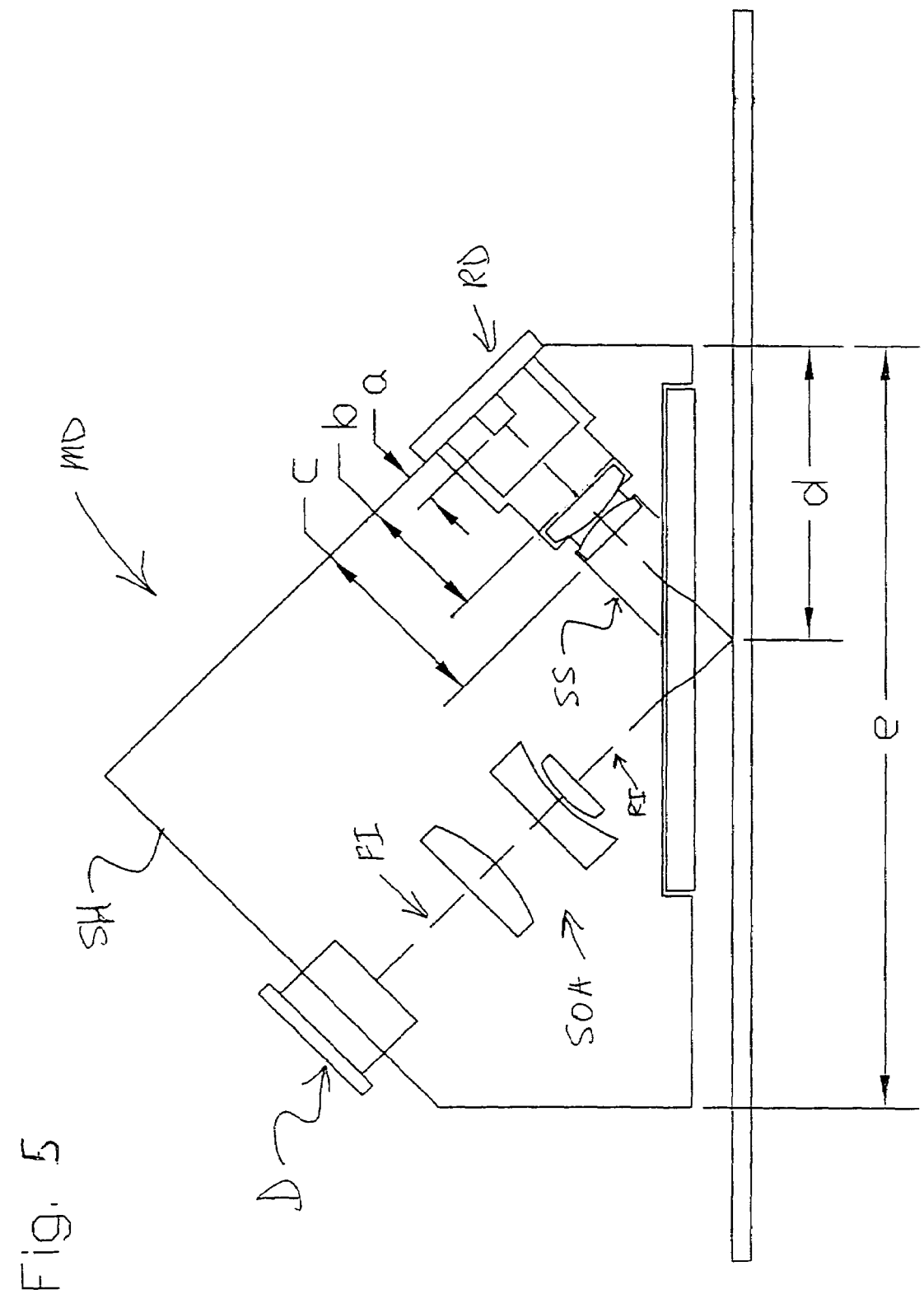

OPTICAL TRIANGULATION DEVICE AND METHOD OF MEASURING A VARIABLE OF A WEB USING THE DEVICE

BACKGROUND OF THE INVENTION

1. Field of the invention

The invention relates to an improved triangulation device which utilizes a tightly focused-projected light spot and a high frequency position sensitive detector. The invention also relates to using such a device to indicate and/or measure a variable of a web such as surface plasticization, surface roughness, surface gloss, coating quality, surface density, mean distance between fibers of a paper web, ash content of a paper web surface, etc. The invention also relates to a method of measuring a thickness of a web, and specifically a moving web, using a triangulation device arranged on both sides of the web.

2. Description of the Prior Art

Optical triangulation is accomplished by a device which projects a small spot of light onto a surface. A lens, whose optical axis is at an angle to the axis of the projected light, forms an image of the spot onto a position sensitive detector. If the surface moves closer or farther from the device, the image of the spot moves as a result. The output of the position sensitive detector is used to determine the distance from the device to the surface.

The thickness (or caliper) of a sheet can be measured with two optical triangulation devices located on opposite sides of the sheet and arranged at a known distance apart. Each device measures the distance to one side of the sheet and the sum is subtracted from the known distance apart in order to obtain the caliper.

Single sided applications for thickness measurement are possible, i.e. if the web is supported by a roll, the optical device measures the distance to the paper surface. This distance is subtracted from the known the distance to the roll to determine thickness.

Caliper is an important measurement in papermaking. The industry standard caliper sensor is an electromechanical device. A ferrite disc touches one side of the sheet while a coil with a ferrite U-core touches the other side. The coil is part of the resonant circuit of an oscillator. When the caliper of the sheet changes the distance between the ferrite disc and the U-core changes. This shifts the resonant frequency of the oscillator. This type of sensor is capable of sub micron accuracy and is widely used all over the world.

There are disadvantageous with using a device with parts which touch the sheet, i.e., with a device which uses contact measurement. The main disadvantage of the device is that on fast moving sheets, such contact can produce holes or tears. These holes or tears occur when an imperfection in the sheet, such as grit, hits the caliper sensor. Usually, this tearing has the form of a triangular shaped hole with the apex at the imperfection. Then, if paper sheet with a hole reaches, e.g., a printing press, the hole can cause a costly sheet break that typically stops the press for several hours. As more recycled products are used in papermaking, imperfections become a growing problem. An accurate non-contacting caliper sensor would therefore solve the growing problem of holes or tears caused by contact measuring devices.

Besides these holes or tears, the contacting elements of the measuring device also can cause marks on a sheet. These marks are typically shiny streaks formed on the surface of the sheet due to a "polishing" effect caused by the contacting sensor elements. These more polished surface areas can be responsible for uneven color application during, .e.g., a printing process. As a result, contacting caliper measurement is not used on sensitive paper grades.

Optical triangulation has been used for non-contacting measurement of paper caliper. One factor, which limits the accuracy of this measurement, however, is the scattering of light into the paper. Paper is generally a mat of wood fibers bonded together. As light scatters between the fibers, the projected light spot diffuses into the paper forming a larger spot (i.e., larger than the spot initially projected onto the surface) centered below the surface of the paper. Since paper fibers are randomly distributed, the relationship between the center of the projected light spot and the surface of the paper is inconsistent. This inconsistency contributes to error when compared to a mechanical caliper measurement technique.

Scattering will cause the non-specularly reflected spot size from paper to be approximately 50 to 100 µm in diameter regardless of how small the incident beam is made. As a result, it is very difficult to determine the spot position with an accuracy that is adequate for the required 0.25 µm measurement resolution.

SUMMARY OF THE INVENTION

The invention avoids the inaccuracy that results from light scattering from inside the sheet by concentrating on surface features. These surface features cause high frequency variations in the reflected light, especially at specular angles. Thus, light reflected from the surface can be detected separately from the overall reflectance by observing the high frequency signals from the detector system.

The invention utilizes optical triangulation with a new way of selecting only the light returning from the surface of the sheet, and rejecting the light that has scattered into the sheet. In this regard, the invention utilizes two main features: a tightly focused projected light spot and a high frequency position sensitive detector.

According to the invention, the light spot is projected onto a surface, e.g., the surface of a web, and, in particular, the surface of a moving paper web. The light spot will quickly change from being tightly focused at the surface of the sheet to larger and larger diameter as the light diffuses into the sheet. The tightly focused spot at the surface resolves small features on the paper, such as fibers and fiber clumps. Because the sheet is moving, the image of this spot at the detector will have high frequency components. The larger portions of the spot(s) from further into the sheet will have only lower frequencies because of the inability of larger spots to resolve small features.

By finding the position of the high frequency component of the spot image, the position of the surface of the paper can be isolated. This eliminates error cause by averaging all frequencies, which include components of the image from deeper into the sheet.

The invention makes it possible to measure the distance from the optics to the surface of the sheet accurately by only measuring the high frequency variations in reflected light from a small laser spot. These variations are caused by sheet roughness. Furthermore, this optical system has no moving parts.

The invention also provides for a method of measuring a position of an irregular surface, wherein the method comprises projecting a spot along a first axis onto the irregular surface, focusing an image of the spot along a second axis onto a detector, wherein the second axis is non-coaxially arranged with respect to the first axis, processing signals from the detector, and calculating the position of the irregular surface based on at least one isolated desired frequency component of the signals.

The detector may comprise a high frequency position sensitive detector. The DC signal component may be indicative of at least one isolated desired frequency component of the signals. The spot may be a tightly focused spot. The focusing may utilize an optical arrangement whose axis coincides with the second axis. The first and second axes may each be oriented at an angle relative to an imaginary line extending perpendicular to the surface. The first and second axes may each be oriented at the same angle relative to an imaginary line extending perpendicular to the surface. The detector may comprise a position sensitive detector. The detector may comprise a plurality of detector elements. The at least one isolated frequency signal may comprise high frequency signals.

The focusing may comprise focusing, with an optical arrangement, the image of the spot onto the detector, whereby the image comprises specularly reflected light. The focusing may comprise focusing, with an optical arrangement, the image of the spot onto elements of the detector, whereby the image comprises specularly reflected light. The focusing may comprise focusing, with an optical arrangement, the image of the spot onto elements of the detector, whereby the image comprises specularly reflected laser light.

The image of the spot may comprise only specularly reflected light. The image of the spot may only includes a frequency range produced by specularly reflected light.

The processing may comprise processing the signals using fast Fourier transformation (FFT), whereby FFT is utilized to isolate the desired frequency components of the signals. The processing may comprise processing the signals using digital filtering, whereby digital filtering is utilized to isolate the desired frequency components of the signals. The processing may comprise processing the signals using analog filtering, whereby analog filtering is utilized to isolate the desired frequency components of-the signals.

The detector may comprise a multi-element detector array. The detector may comprise two detector elements.

The method may further comprise, prior to the calculating, determining a balance of the signals from the two detector elements.

The signals may be AC-signals. The at least one isolated desired frequency component of the signals may comprise an AC signal component of the signals. The method may further comprise determining another position deeper into the surface based on the calculating. The method may further comprise comparing the position to the other position to determine a penetration depth of the spot. The projecting may comprise projecting the spot of light along the first axis onto the irregular surface, and the method may further comprise comparing the position to the other position to determine a penetration depth of the light.

The projecting may comprise projecting the spot of electromagnetic radiation along the first axis onto the irregular surface. The electromagnetic radiation may comprise light. The electromagnetic radiation may comprise laser light.

The at least one isolated desired frequency component of the signals may comprise multiple AC signal components of the signals. The method may further comprise selecting, from the multiple AC signal components, an AC signal component which best physically represents the surface. The multiple AC signal components of the signals may comprise simultaneously produced multiple AC signal components of the signals. The selecting may utilize amplitude criteria.

The method may further comprise selecting, from the multiple AC signal components, an AC signal component based on at least one of a speed of the surface and at least one optical property of the surface.

The method may further comprise selecting, based on at least one of a speed of the surface and at least one optical property of the surface, the at least one isolated desired frequency component of the signals. The calculating of the position of the irregular surface may also be based on a DC signal component of the signals.

The surface may be arranged on a web and wherein the method further comprises determining a thickness of the web.

The method may further comprise determining the position of the surface at various locations of the surface. The method may further comprise measuring positions of another surface opposite the surface in order to determine a thickness at various locations. The method may further comprise measuring, on a paper machine, positions of another surface opposite the surface in order to determine a thickness at various locations. The method may further comprise measuring positions of another surface opposite the surface online in order to determine a thickness at various locations.

The method may further comprise measuring a position of another surface opposite the surface in order to determine a thickness.

The method may further comprising producing information related to a property of the surface. The property may comprise at least one of surface plasticization, surface roughness, surface gloss, coating quality, surface density, base paper density, mean distance between fibers, ash content of the surface.

The invention also provides for a measuring device for determining a position of an irregular surface, wherein the device comprises a device for producing electromagnetic radiation. A device is provided for projecting a spot along a first axis onto the irregular surface. A detector is utilized. A device is used for focusing an image of the spot along a second axis onto the detector. The second axis is non-coaxially arranged with respect to the first axis. A device is provided for processing signals from the detector. The measuring device is structured and arranged to calculate the position of the irregular surface based on at least one isolated desired frequency component of the signals.

The device may further comprise a window arranged between the surface and each of the device for producing electromagnetic radiation and the detector. The measurement device may be arranged on a quality scanner located in a paper machine.

The invention also provides for a measuring system for determining a thickness of a web having irregular surfaces, wherein the system comprises a first device for producing electromagnetic radiation. A first device is used for projecting a first spot along a first axis onto a first irregular surface of the web. A first detector is utilized. A first device is used for focusing an image of the first spot along a second axis onto the first detector. The second axis is non-coaxially arranged with respect to the first axis. A second device is used for producing electromagnetic radiation. A second device is used for projecting a second spot along a third axis onto a second irregular surface. A second detector is utilized. A second device is-provided for focusing an image of the first spot along a fourth axis onto the second detector. The fourth axis is non-coaxially arranged with respect to the third axis. A device is used for processing signals from the first and second detectors. The measuring device is structured and arranged to calculate the thickness between the first and second irregular surfaces based on at least one isolated desired frequency component of the signals.

The invention also provides for a measuring system for determining a thickness of a web having opposite facing first and second irregular surfaces, wherein the system comprises a first laser light producing device. A first lens arrangement is used for projecting a first spot along a first axis onto the first irregular surface of the web. A first detector comprises detector elements. A second lens arrangement is used for focusing an image of the first spot along a second axis onto the detector elements of the first detector. The second axis is non-coaxially arranged with respect to the first axis. A second laser light producing device is included. A third lens arrangement is used for projecting a second spot along a third axis onto the second irregular surface. A second detector comprises detector elements. A fourth lens arrangement is used for focusing an image of the second spot along a fourth axis onto the second detector. The fourth axis is non-coaxially arranged with respect to the third axis. A device is used for processing signals received from the first and second detectors. The measuring system is structured and arranged to calculate the thickness between the first and second irregular surfaces based on at least one isolated desired frequency component of the signals.

The invention also provides for a method of determining a position of an uppermost portion of an irregular surface of a web relative to a reference position, wherein the method comprises producing a light, focusing, with a first lens arrangement, the light into a tightly focused spot onto the irregular surface, wherein the first lens arrangement is oriented along a first axis, focusing, with a second lens arrangement, a reflected image of the spot along a second axis onto detector elements of a detector, wherein the second axis is oriented at an angle with respect to the first axis, preventing a substantial portion of the light reflected from a position beneath the uppermost portion of the surface from being focused onto the detector elements, processing signals from the detector, calculating the position of the uppermost portion of the irregular surface based on the signals and the reference position, and at least one of displaying the position as a value, storing the position, and communicating the position to a processor.

The light may comprise laser light, visible laser light, or incandescent light.

The method may further comprise simultaneously determining a position of an oppositely facing uppermost portion of another irregular surface of the web relative to a another reference position, and calculating a thickness of the web based on the positions of the oppositely facing uppermost portions of the web.

The simultaneously determining may comprise producing another light, focusing, with a third lens arrangement, the other light into a tightly focused spot onto the other irregular surface, wherein the third lens arrangement is oriented along a third axis, focusing, with a fourth lens arrangement, a reflected image of the spot along a fourth axis onto detector elements of another detector, wherein the third axis is oriented at an angle with respect to the fourth axis, preventing a substantial portion of the light reflected from a position beneath the oppositely facing uppermost portion from being focused onto the detector elements of the other detector, processing signals from the other detector, calculating the position of the oppositely facing uppermost portion of the other irregular surface based on the signals and the other reference position, at least one of displaying the position as a value, storing the position, and communicating the position to a processor, and determining a thickness of the web based on the positions of the oppositely facing uppermost portions of the web.

The invention also provides for a method of determining a position of an uppermost portion of an irregular surface of a web relative to a reference position, wherein the method comprises producing a beam of electromagnetic radiation, focusing, with a first lens arrangement, the beam into a tightly focused spot onto the irregular surface, wherein the first lens arrangement is oriented along a first axis, focusing, with a second lens arrangement, a reflected image of the spot along a second axis onto detector elements of a detector, wherein the second axis is oriented at an angle with respect to the first axis, producing at least one signal based on a frequency analysis of the reflected image of the spot, producing at least one other signal based on a frequency analysis of the reflected image of the spot, comparing the at least one signal to the at least one other signal, determining the position of the uppermost portion of the irregular surface based on the comparing and the reference position, and determining at least one other position beneath the uppermost portion of the irregular surface based on the comparing.

The method may further comprise producing a value indicative of at least one property of the web. The at least one property may comprise at least one of surface plasticization, surface roughness, surface gloss, coating quality, surface density, base paper density, mean distance between fibers, and an ash content of the surface.

The method may further comprise generating the at least one signal based on a high frequency component of the reflected image of the spot. The method may further comprise generating the at least one other signal based on a DC component of the reflected image of the spot.

The method may further comprise generating the at least one signal based on an AC component of the reflected image of the spot.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein:

FIG. 4 shows a schematic view of the image of the spot focused on two detector elements of a detector; and FIG. 5 shows one non-limiting measuring device.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
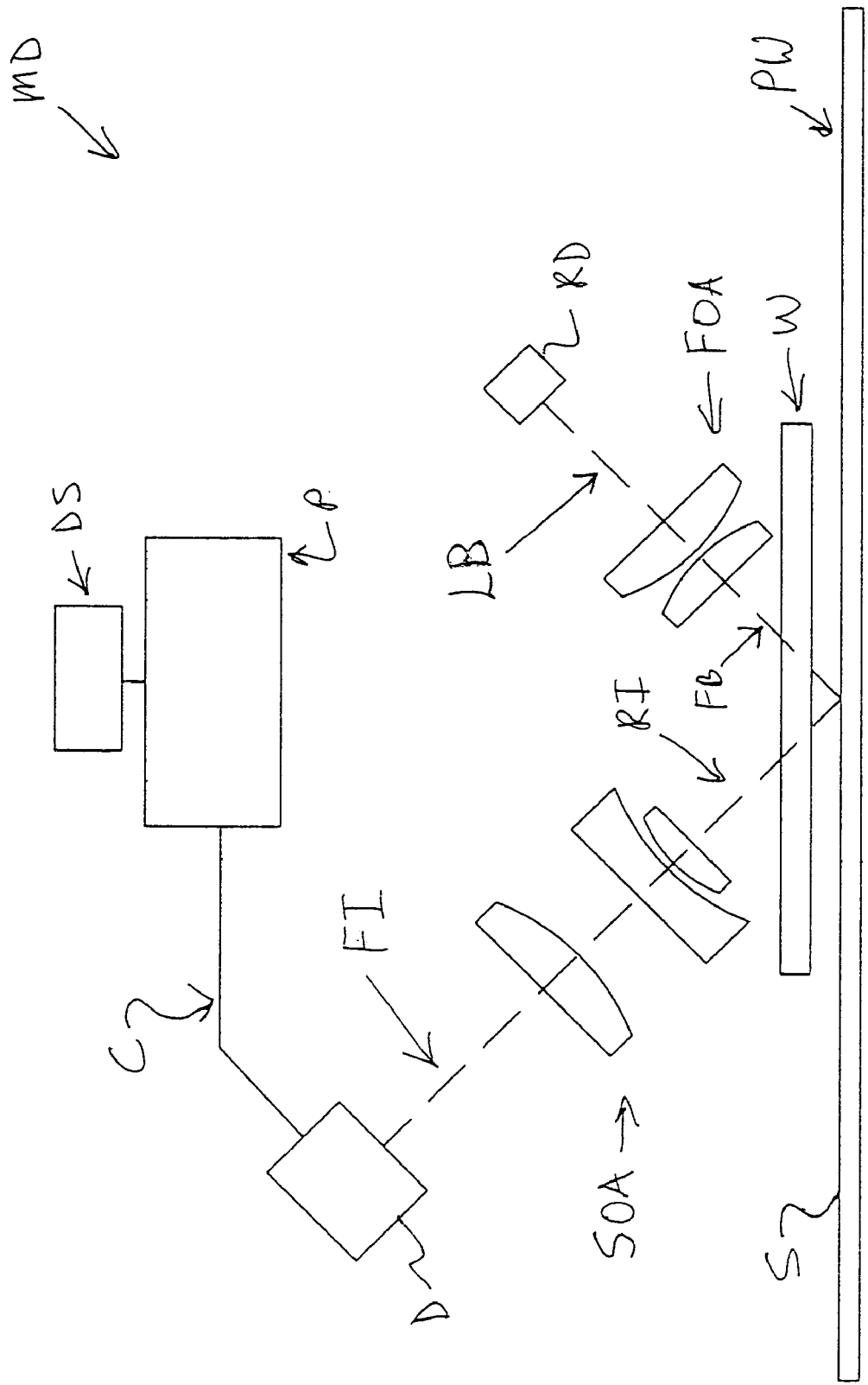
FIG. 1 shows a schematic view of a measuring device according to the invention.

FIG. 1 shows one non-limiting embodiment of a measuring device MD according to the invention. The device MD includes electromagnetic radiation producing device RD which can have the form of, e.g., a laser, a laser diode, or an incandescent bulb with a pinhole aperture. A laser light source is preferred because of its relatively small size and its ability to produce a high intensity light beam LB. The light beam or beams LB is/are projected onto a surface S of a paper web PW with a first lens or optical arrangement FOA. The first lens arrangement FOA focuses the light beam(s) LB into a focused beam or beams FB which forms a tightly formed spot on the surface S. By way of non-limiting example, the first optical arrangement FOA can have an axis which is oriented at an angle of approximately 45 degrees relative to an imaginary line projecting perpendicularly from the surface S. Of course, other angles can be chosen, including a normal incidence angle.

The detector D of the measuring device MD is connected to via a electrical conduit C to a processor P. A display device DS is used to display the measurement results from the processor P. Of course, the invention contemplates other methods of providing communication between the detector D and the processor P such as, e.g., a wireless connection.

By way of non-limiting example, the first optical arrangement FOA utilizes two plano-convex lenses and an aperture stop. Of course, numerous ways can be utilized to provide the appropriate spot size. The primary concern is the handling of spherical aberration. In theory, the best solution would be a custom designed aspherical lens system. This would allow a much more efficient light collection efficiency. However, such an arrangement could be very expensive. Accordingly, the invention utilizes a lens arrangement FOA which uses standard lenses and an aperture stop.

By way of non-limiting example, the radiation device RD can preferably be a laser diode such as Mitsubishi ML101J8 producing a continuous wave at a 660 nm wavelength. The laser diode is operated with a stable current source. Some laser diodes, however, include an integrated photodiode. In those cases, a control circuit can be used to mo maintain constant output intensity based on the photodiode output. Shorter wavelength laser diodes are also available which facilitate a very small projected spot size. A spot size with 660 nm is sufficient because it is smaller than the surface features that are detected. Thus, reducing the spot size further will not improve the accuracy. The preferred laser diode type is an edge-emitting device. The source spot is smaller than the source spot of a VCSEL (Vertical Cavity Surface Emitting Laser) type device.

If a non-laser source is utilized, then the source aperture needs to be comparable in size to that of the laser source. A light emitting diode could be used with appropriate optics that would reduce the spot projected onto the sheet to an appropriate size. Other non-laser sources could also be used as long as the light source noise in the frequency range of interest is low. In practice, the size of the source aperture before the optical reduction should not be more than approximately 100 micrometers. Obtaining adequate beam intensity with a non-laser source, however, may not be easy.

Polarized light from a laser or non-laser source can be used to further enhance the contrast between the light reflected from the surface S and light scattered from inside the sheet. Scattered light would no longer be polarized.

An effective size for the tightly focused spot can be in the range of between approximately 3 micrometers and approximately 5 micrometers. Preferably, the tightly focused spot size is approximately 1 micrometer or less. Measurement accuracy depends directly on how accurately the detector system can determine the center of this spot. The required accuracy of determining this center position must be better than approximately 0.25 micrometers; otherwise the overall thickness measurement accuracy of 0.3 micrometers required for lightweight paper grades is not possible. The tightly focused spot need not be circular or round, however. The only critical dimension is the width of the spot crossing the plane defined by the centerline of the laser source beam LB and/or FB and the centerline RI and/or FI of the detector optics SOA. The spot can be tens of micrometers wide due to the fact that light penetrates quite deep into the sheet and scatters multiple times on the way. As a result, the invention therefore utilizes a high-frequency component of the signals generated by the image of the spot.

A window W is arranged between the first lens arrangement FOA and the surface S to create a smooth surface without any crevasses where dust can collect. In operation, the surface S contacts or is positioned within a small distance X, typically less than approximately 100 micrometers from the outside surface of the window W so that the window W will never protrude outside the smooth surface S. In a dust free environment, the window W may not be required. However, in paper mill environments dust is usually present and the window W may therefore be necessary. As will be described later on, the system takes into account the refraction produced by the window W.

The window W should be as thin as possible, yet strong enough to withstand the environment of paper making. Because of refraction, the window W causes the effective focal length of the optics to be longer. This increases the size of the device. The window W will also distort the focus slightly, because it is in the part of the optical path where the beam is either converging or diverging. A preferred window material is Sapphire because of its high strength and high refractive index. A preferred thickness for the window W is approximately 0.5 mm. A thinner window W would be optically better, but its durability in a paper machine environment may be questionable.

As explained above, an image of the spot projected on the web or sheet PW is reflected from the surface S. The reflected image RI (which can be in the form of one or more beams) is focused onto a detector D via a focused image beam or beams FI using a second lens or optical arrangement SOA. By way of non-limiting example, the second optical arrangement SOA can have an axis which is oriented at an angle of approximately 45 degrees relative to an imaginary line projecting perpendicularly from the surface S. Of course, other angles can be chosen as well. Preferably, the axes of the first and second optical arrangements are oriented at the same angle relative to the perpendicular imaginary line. However, as long as the detector optics SOA is not arranged coaxial with the projection optics FOA, the triangulation system used by the measuring device will work.

As with the projection lens system FOA, the main concern with the design of the second lens arrangement SOA is spherical aberration. On the detector side, there is the additional concern of off-axis rays (chromatic aberration) when the sheet is not close to the nominal position, i.e., not in perfect focus. To solve this problem, the invention utilizes a small short focal length piano-convex lens followed by a larger piano-concave lens, and then finally followed by a plano-convex lens. Arranged after the last plano-convex lens is an aperture stop (not shown) which is placed slightly off center to compensate the small distortion caused by the flat window W in the converging part of the beam. As with the projection lenses FOA, there are numerous ways to achieve adequate optical behavior. A preferred way utilizes commercially available standard lenses. However, the invention contemplates using custom designed lenses in order to improve light collection efficiency.

By way of non-limiting example, the position detector D may be a lateral effect photodetector such as Model SL3-1, or similar models made by UDT. Such devices are available from several manufacturers. The detector D can also be a two-element (bi-cell) detector such as Model No. SD160-24-21-021 from Advanced Photonics. This detector has two identical elements separated by a very narrow gap. This detector type is more stable, has a lower noise level, and is better suited for high frequency operation than lateral effect devices. The invention also contemplates a high-speed detector array with a large number of micrometer size detector elements that can be read in parallel. This would allow the position of the high frequency spot to be detected with equal accuracy regardless of where it is located, as long as its image falls on the detector area. At this time, however, such a device is not commercially available. The currently available two-element detector is very accurate when the light spot image falls in the middle of the detector. However, the measuring range is not wide.

The measuring system allows movement of the spot image at the detector D to be amplified as the angle between the axis of the projection optics FOA and the axis of the detector optics SOA increases.

The geometry and/or relative positioning of the measuring system (and specifically parts RD, FOA, W, SOA and D) should be specifically designed to maximize collection of specularly reflected light. Specular light is not required for optical triangulation, but it has some advantages for isolating the location of the surface S of the paper web or sheet PW.

The invention can provide maximum information of the surface S when the specular light is reflected only from the surface S of the paper web or sheet PW. This is because specular light increases high frequency signal variation. Irregularities in the surface S of paper will move specular light in and out of the field of view of the optics SOA.

Both lateral effect detectors and two-element detectors have two outputs. A standard way to calculate the position of the spot image is based on the following formula:

$$X=(A-B)/(A+B)$$

where A and B are the two detector signals.

Usually, this calculation is performed by using the dc-outputs directly. However, the invention is based on observing the variations caused by the surface roughness of paper. The narrow beam reflects from individual fibers and other particles on the sheet surface S. This causes high frequency fluctuations in the signal reflecting from the surface S. Scattering from positions deeper than the surface S will be diffuse, thereby forming a wider spot without the high frequency component. The algorithm for the high frequency signals is based on using an adjustable band pass filter that selects the high frequency components which correspond to the paper speed and the typical size of the surface features. The amplitudes or rms-values can then be calculated, and the formula $X=(A-B)/(A+B)$ is used to calculate the position.

If a multi-element array becomes commercially available, the signal from each element would be filtered with a band pass filter and the amplitude would be determined the same way as it is for the two-element device. These signals would have a bell-curve like distribution over the array surface. The position of the surface could then be determined from the centroid of this distribution.

The ideal detector D would have many tiny high-speed elements. By way of non-limiting example, these detector elements can be elements which operate and/or function at a frequency range of between approximately 1 MHZ and approximately 4 MHZ. The invention can also utilize currently available high-speed detectors which have only a few large detector elements. Preferably, the detector D utilizes only two detector elements (see FIG. 4). The signal balance between the two elements E1, E2 can be used to determine the position of the image. Moreover, a high-speed signal balance can be compared to a DC signal balance using two detector elements.

Almost all acceptable detector element types E1, E2 are Silicon PIN-diodes. Other types such as Germanium or InGaAs could, in theory, possibly be used. However, they have their best sensitivity in longer wavelength, and longer wavelengths result in a larger spot size. Accordingly, Silicon detectors should be used at this time since they are without a practical alternative. Charge coupled devices (CCD) which utilize arrays (also a Silicon device) could be used for lower frequencies, but for frequencies in excess of 1 MHZ, which is what is required for a paper machine application, these devices are not adequate.

The signals from detector elements E1, E2 are converted to high-speed voltage signals with a preamplifier (not shown). The preamplifier(s) can generally be high speed, high input impedance low noise devices. Silicon photodetectors will be operated with a voltage bias to enhance detector speed as opposed to operating them in the photovoltaic mode. By way of non-limiting example, a known high-speed Silicon detector preamplifier can be utilized. The signals are then processed either with an analog filter and rms-detector, or preferably digitized at a very high sampling rate and processed in a DSP (digital signal processor). By way of non-limiting example, a known DSP can be utilized. There are, however, numerous acceptable alternatives that all work in the same way. Such devices are designed to run software for digital filters. The DSP can utilize a band pass algorithm that may be automatically adjusted to find the most advantageous frequency, possibly taking into account the paper machine speed. The band pass DSP algorithm can either be a multiple band pass algorithm with several bands that cover the frequency range of interest, a single band pass filter that is chosen based on a paper speed and type with the filter parameters downloaded to the sensor from an upper lever computer, an adaptive filter automatically that adjusts the band center frequency for maximum signal, or a Fourier transform algorithm (either EFT or DFT) that produces a full frequency spectrum followed by an algorithm that selects the frequency range with maximum amplitude. The preferred method is based on Fourier transform, but this method is very computation intensive and may result in a slow sensor response.

In operation, the optics SOA is set up to focus the spot image SP directly between the two detector elements (see FIG. 4). If the sheet moves from its nominal distance from the window W, the center of the image shifts to one E1 or the other E2 elements. In addition to the nominal image shift, there will be small shifts in the image caused by surface regularities. However, by using a tightly focused spot at the surface S of the paper web PW, many of these small-scale irregularities can be resolved by the spot itself, and will result in a rapidly shifting component of the spot at the detector D.

Other or additional irregularities modulate the specular light reaching the detector elements E1, E2, adding to the high frequency component of the signal. The signal generated by specularly reflected light will generally have a higher frequency than that generated by the shifting image of the tightly focused spot. This is because irregularities smaller than the spot size can specularly reflect a portion of the light into the detector elements E1, E2.

The highest frequency components result from parts of the individual fiber surfaces or filler or coating particles momentarily lining up in a specular angle with the source and the receiver within the small area illuminated by the light source. Typical fiber diameter is between approximately 5 and approximately 50 micrometers. Filler and coating particles have a typical size ranging from less than a micrometer to one or two micrometers. Sheet processing in the paper machine will flatten the fibers and typically reduce the height of the irregularities to between approximately 1 to approximately 2 micrometers. If the lateral size of the particles reflecting the light is smaller than the size of the light beam, then the reflection pulses resulting from the particles will have a maximum duration that equals the time it takes for the particle to travel across the light beam. With a light spot size of five micrometers and a typical high-speed paper machine speed of approximately 1500 m/min the typical highest meaningful frequency is the paper speed divided by the beam size. Using a beam size of approximately 5 micrometers and paper speed of approximately 1500 m/min, the maximum frequency would be approximately 5 MHz. Smaller beam resulting in higher maximum frequencies may be used.

Diffuse light scattered from inside the sheet forms a spot that is typically between approximately 50 and approximately 100 micrometers wide. The high frequency signal amplitude resulting from diffuse scattering from inside the sheet is low and the maximum frequency corresponding to the diffuse spot size is significantly lower than what results from surface reflections. With a 1500 m/min paper machine speed the maximum frequency resulting from the diffuse spot would be approximately 500 kHz. Thus, if the beam size is approximately 5 micrometers or less and frequencies below approximately 1 MHz are filtered out, then the effect of the diffuse scattering from inside the sheet is eliminated for paper speeds ranging from between approximately 300 m/min to approximately 3000 m/min. This range covers the entire practical range of paper machine speeds.

Source beam size on the sheet surface is the main factors determining the minimum detectable particle (or surface irregularity) size. Detector optics determines the accuracy for detecting the position that the reflection is coming from.

Frequency components that best correspond the high frequency signals caused by the surface irregularities described above are isolated by selectively filtering out the unwanted lower frequencies and by limiting the high frequency end so that all the frequencies caused by actual reflections from the surface are included. However, high frequency electronic noise is excluded. In the simplest form this can be done with a single band pass filter that covers all frequencies of interest for a normal paper machine speed range and a selected optical beam size. A narrower frequency band can be used if the filter center frequency is adjusted based on paper machine speed and paper type. Narrower filter bandwidth will improve sensor's signal to noise ratio. A more sophisticated filter system includes multiple band pass filters with pass bands covering the frequency range of interest with one pass band ending where the other one starts. This method allows the detection of the frequency spectrum, and with the spectrum it is possible to select the frequency band with the strongest signal thus improving sensor's signal to noise ratio.

The highest frequency component of the signal is thus determined by the resolution of the optics SOA, the scale size of irregularities on the sheet PW and the sheet speed (which is a variable of the paper machine). In a paper making environment, in order to process the highest frequency component, the signal processing must adapt to the sheet speed. There are several ways in which the signal processing can accomplish this. One non-limiting way involves frequency transformation, for example, FFT (fast Fourier transformation). This gives a complete frequency versus signal amplitude analysis of the signal(s). Another way involves digital filtering. This way may utilize software to filter the signal(s) and to pass the frequency range of interest. Digital filtering has the advantage of allowing for programming to adjust the range and track changes in sheet speed. Still another way involves analog filters which can be designed so that the cut-off frequency can be electronically adjusted to track sheet speed.

The filtering can be accomplished with either analog or digital filters. Digital filters have the advantage that the frequency and other properties of the filter can be easily adjusted, because filtering is done in software. With digital filtering the sampling rate must be several times the highest frequency of interest, and a low pass analog filter (anti-aliasing filter) is required before the signal is sampled with the analog to digital converter.

Analog filters can also be made adjustable, but not as easily as the digital filters. In the frequency range required for the invention, application adjustments would typically be done by switching different passive components (resistors or capacitors) in and out under computer control.

With high-speed digital system the frequency spectrum can be determined by performing a frequency transformation, typically with an FFT algorithm. The frequencies with the strongest amplitudes would then be chosen and the associated amplitudes would be used from each of the detector elements.

The types of filters, either analog or digital, as well as time domain to frequency domain algorithms are well known in the art of signal processing. Specific filter types and filtering algorithms will be chosen to optimize performance.

The RIMS amplitude of the signal from each element over the frequency range of interest is measured using one of the arrangements described above. As explained above, it is possible to select a range where only specularly reflected light would be included, by setting the lower cut-off frequency above the spot size limited frequency.

The signals produced by the detector elements will typically be voltages. Preferably, these signals digitized (i.e., converted to digital signals with, e.g., an analog to digital converter) and then passed to a high frequency band-pass filter as explained above. Thereafter, the digital signals are filtered subjected to additional signal processing. Analog processing is also possible. However, it is much more difficult to adjust the filter pass band to match the paper surface quality and paper machine speed with analog signals.

The balance can be calculated for example by the equation:

$$BAL_{rms} = (A_{rms} - B_{rms}) / (A_{rms} + B_{rms})$$

Where $BAL_{rms}$ is the balance of the desired frequency components of the signals from the detector elements, $A_{rms}$ is the rms amplitude of the desired frequency component of one element of the detector, and $B_{rms}$ is the rms amplitude of the desired frequency component of the other element. The position of the surface of the paper sheet is directly proportional to $BAL_{rms}$.

The invention is not limited to two element detectors and also contemplates the use of other equations. For example, it is possible, though not necessary, to take into account (in the equation) the shape of the spot size and the intensity distribution within the spot. Then, it becomes possible to model the balance as a circular spot which is moved between the sensitive elements. It is also possible, through preferred, to use other methods than the RMS to get a value for the signal intensity.

If a detector array is used, then the simple formula (A−B)/(A+B) obviously cannot be used. Instead, the same filtering and rms or amplitude algorithms used for the two elements of the simple system are applied to all of the detector array elements. Signal amplitudes $A_i$, where i is the index referring to the element position in the array are then used to determine the centroid of the beam. This can be done in numerous ways. One simple way is to calculate the median position where the sum of measured signal amplitudes is equal on both sides. Another way is to assume a predetermined intensity distribution, typically Gaussian, and to perform a curve fit to determine the position of the maximum.

Similarly, a possible way to calculate the DC balance is:

$$BAL_{dc}=(A_{dc}-B_{dc})/(A_{dc}+B_{dc})$$

Where the "dc" subscript indicates the use of a "dc" signal value in place of the rms amplitude of the filtered signal.

The "dc" balance and/or lower "ac" frequency components may be needed for very smooth sheets where little high frequency signal is generated. The dc-based system uses direct dc-coupled signals from the detector elements and then calculates the position using the same formulas as used for the high frequency system after the amplitudes or rms-values of the filtered signals are determined, i.e., the formula X=(A−B)/(A+B) for the two-element detector, or a centroid finder algorithm if a multi-element array is used.

Applications involving paper webs will probably never need to deal with a surface that is too smooth for the high frequency method. One main reason for possibly using a dc-method is to be able to handle stationary calibration standards. These standards would be made out of a smooth, uniform, non-transparent material such as back glass.

The comparison of $BAL_{dc}$ and $BAL_{rms}$ can be used to calculate the penetration depth of the light into the paper surface. The amplitude of AC components, or the AC spectrum, can also be used to get an indication of surface properties.

With more data processing, the signals can also be used as an indicator or as a measurement for the following properties of the web such as, e.g.:
 surface plasticization in the calendar;
 surface roughness;
 surface gloss;
 coating quality;
 surface density, especially of the base paper;
 mean distance of and/or between fibers on the paper surface; and
 ash content of paper surface.

Comparing the signal of both sides of the paper can also lead to a measurement of two-sidedness of the paper (differences of sheet qualities as listed above for both sides).

Figure 2:
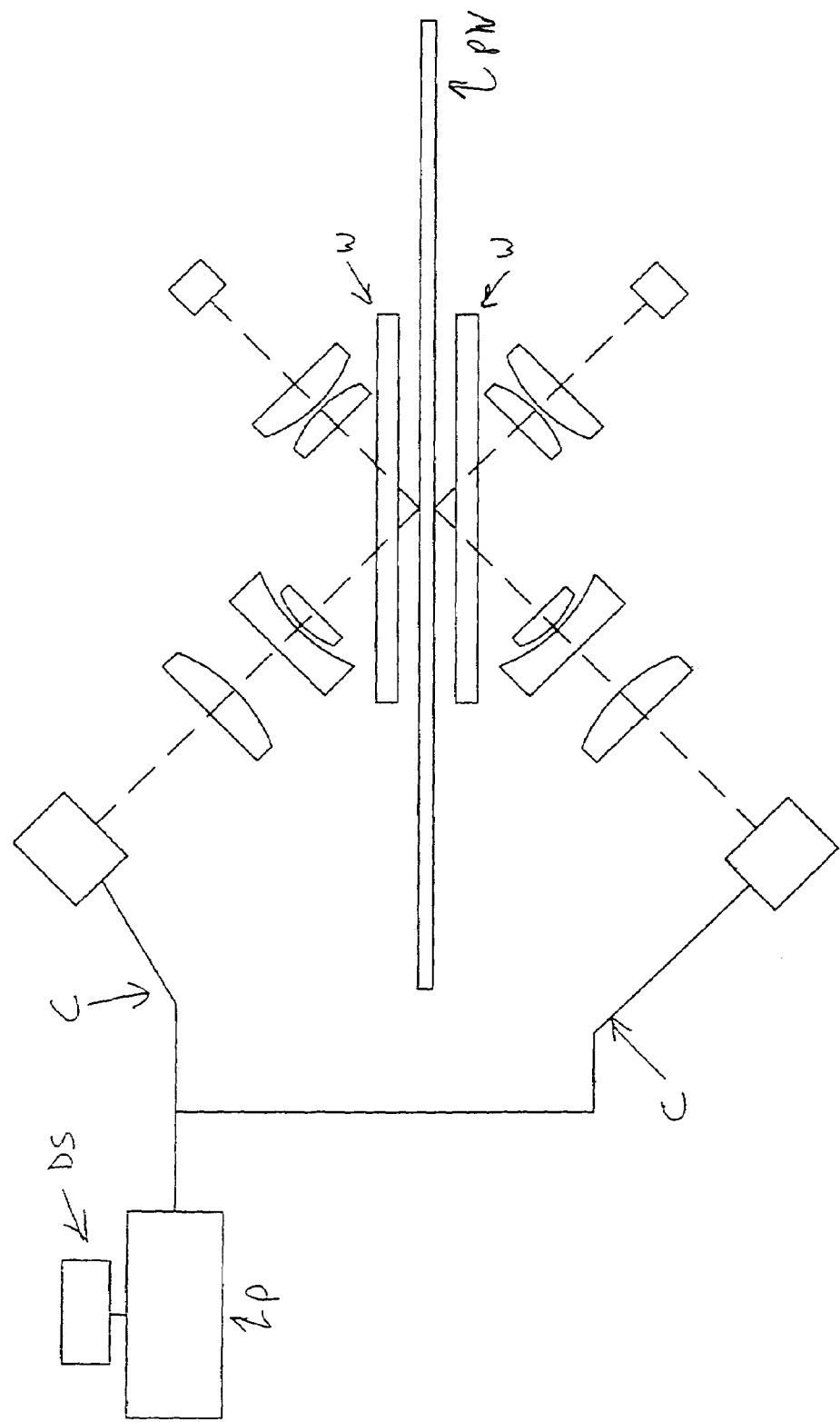
FIG. 2 shows a schematic view of two measuring devices arranged to measure a thickness of a web.

FIG. 2 illustrates two devices of the type shown in FIG. 1 being used to measure a thickness of the paper web PW. Both measuring devices MD are arranged on opposite sides of the web PW. The detectors D of the measuring devices are each connected via a-electrical conduit C to the processor P. A display device DS is used to display the measurement results from the processor P. Of course, the invention contemplates other methods of providing communication between the detectors D and the processor P such as, e.g., a wireless connection.

Figure 3:
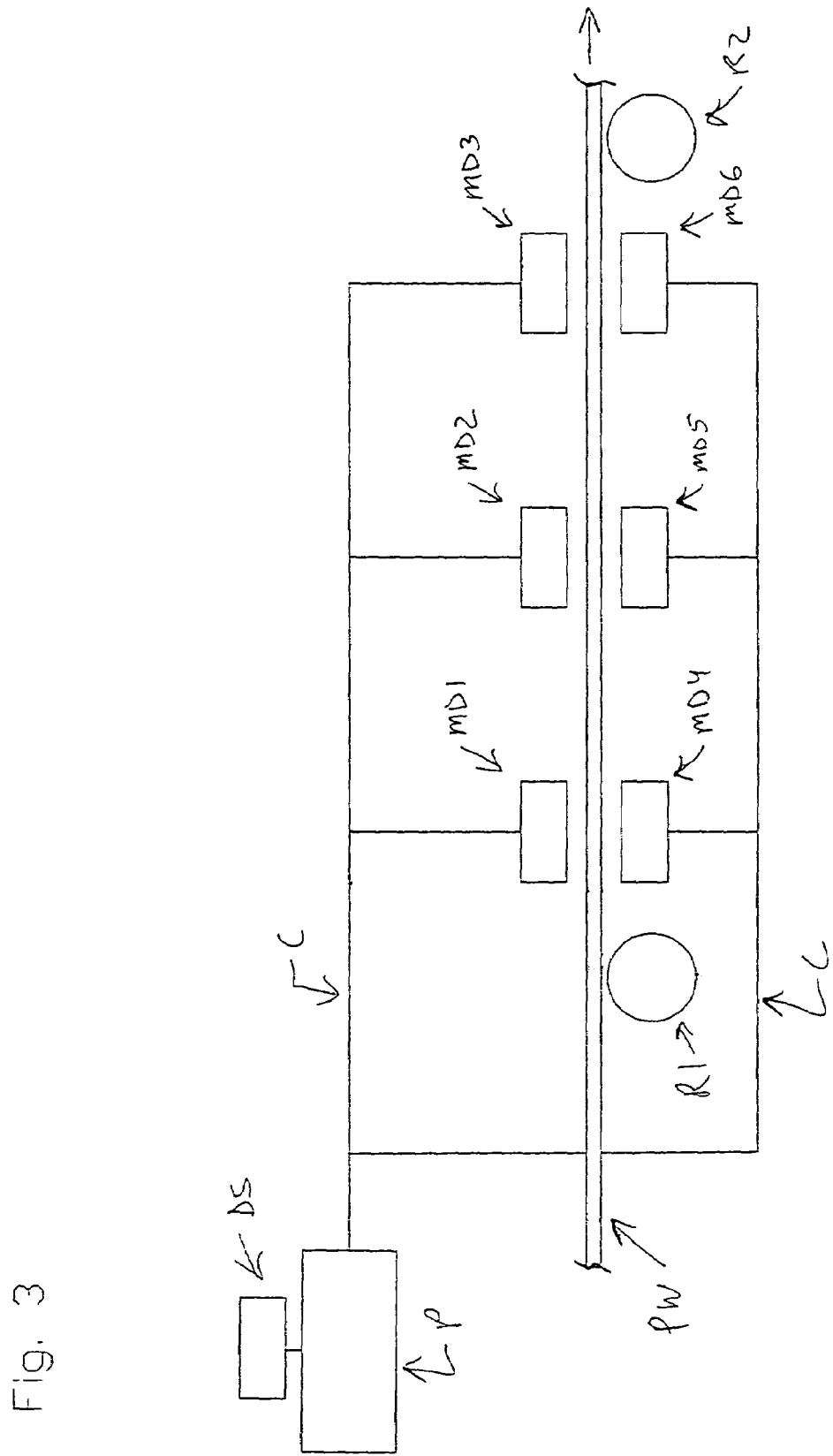
FIG. 3 shows a schematic view of six measuring devices arranged to measure a thickness of a web on a paper machine.

FIG. 3 illustrates six measuring devices MD1-MD6 of the type shown in FIG. 1 being used to measure a thickness of a moving paper web PW in a paper machine environment, which will typically utilize a plurality of rolls R1 and R2 that support the paper web PW. The measuring devices MD1-MD6 are arranged on opposite sides of the web PW. The detectors of the measuring devices are each connected via a electrical conduit C to the processor P. The processor P can even be connected or otherwise operatively associated with one of more influencing devices which can alter the manufacture or process of the paper web PW based on the measuring results. A display device DS is used to display the measurement results from the processor P. Of course, the invention contemplates other methods of providing communication between the detectors D and the processor P such as, e.g., a wireless connection.

Paper thickness (caliper) is measured by measuring the distances to the sheet surface from both sides with optical triangulation and by measuring the total distance between the two triangulation devices with a magnetic sensor, and then by subtracting the triangulated distances from the total gap measurement from the magnetic sensor. The magnetic sensor can operate either with Eddy current principle such as the-sensors available from Kaman and others, or with a magnetic reluctance principle like the traditional caliper sensors used by Voith, Honeywell, ABB and others. The normal way of controlling paper thickness is based on a single scanning double-sided caliper sensor located after a calender nip. Calender nip pressure and pressure distribution across the machine is controlled with feedback from the caliper sensor. Calenders can have multiple controlled nips, and paper machines can have more than one (but normally not more than two) calenders. In theory, a caliper sensor can follow each caliper actuator/control point, although normal paper machine control systems only have one caliper sensor on the entire machine.

FIG. 5 shows one non-limiting measuring device MD which is arranged as a unit. The device has a body or shell SH which houses the optics FOA and SOA, and to which the window W, the radiation device RD, and the detector D are mounted. A shield system SS surrounds the radiation device RD and the first lens arrangement FOA. As can bee seen in exaggerated form, the window W causes refraction of the beams FB and RI. By way of non-limiting example, the device MD may have the following dimensions: a=approximately 1.27 mm; b-approximately 3.59 mm; c=approximately 5.2 mm; d=approximately 7 mm; and e=approximately 22 mm.

The invention also contemplates using the optical triangulation system together with a magnetic device. In this way, the magnetic device can measure the entire gap between the two triangulation devices located on both sides of the sheet PW. The distances to the surfaces could then be measured and the sum of these distances could be subtracted from the total gap in order to obtain the thickness of the sheet. The invention also contemplates arranging the measurement devices on a traversable moving carriage (not shown) so that measurement can occur across an entire width of the moving web PW. The invention also contemplates using a plurality of measurement devices which are statically mounted at various positions across a width of the paper web. In this way, one can determine the thickness variability across a width of the moving web.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed:

1. A method of measuring a position of an irregular surface, the method comprising:
   projecting a spot along a first axis onto the irregular surface;
   focusing an image of the spot along a second axis onto a detector, wherein the second axis is non-coaxially arranged with respect to the first axis;
   processing signals from the detector;
   calculating the position of the irregular surface based on at least one isolated desired frequency component of the signals; and
   measuring the position of the irregular surface based on the calculating.

2. The method of claim 1, wherein the detector comprise a high frequency position sensitive detector.

3. The method of claim 1, further comprising processing DC signals during at least one of calibration and measuring of the position.

4. The method of claim 1, wherein the spot is tightly focused spot.

5. The method of claim 1, wherein the focusing utilizes an optical arrangement whose axis coincides with the second axis.

6. The method of claim 1, wherein the first and second axes are each oriented at an angle relative to an imaginary line extending perpendicular to the surface.

7. The method of claim 1, wherein the first and second axes are each oriented at the same angle relative to an imaginary line extending perpendicular to the surface.

8. The method of claim 1, wherein the detector comprises a position sensitive detector.

9. The method of claim 1, wherein the detector comprises a plurality of detector elements.

10. The method of claim 1, wherein the at least one isolated frequency signal comprises high frequency signals.

11. The method of claim 1, wherein the focusing comprises focusing, with an optical arrangement, the image of the spot onto the detector, whereby the image comprises specularly reflected light.

12. The method of claim 1, wherein the focusing comprises focusing, with an optical arrangement, the image of the spot onto elements of the detector, whereby the image comprises specularly reflected light.

13. The method of claim 1, wherein the focusing comprises focusing, with an optical arrangement, the image of the spot onto elements of the detector, whereby the image comprises specularly reflected laser light.

14. The method of claim 1, wherein the image of the spot comprises only specularly reflected light.

15. The method of claim 1, wherein the image of the spot only includes a frequency range produced by specularly reflected light.

16. The method of claim 1, wherein the processing comprises processing the signals using fast Fourier transformation (FFT), whereby FFT is utilized to isolate the desired frequency components of the signals.

17. The method of claim 1, wherein the processing comprises processing the signals using digital filtering, whereby digital filtering is utilized to isolate the desired frequency components of the signals.

18. The method of claim 1, wherein the processing comprises processing the signals using analog filtering, whereby analog filtering is utilized to isolate the desired frequency components of the signals.

19. The method of claim 1, wherein the detector comprises a multi-element detector array.

20. The method of claim 1, wherein the detector comprises two detector elements.

21. The method of claim 20, further comprising, prior to the calculating, determining a balance of the signals from the two detector elements.

22. The method of claim 1, wherein the signals comprise AC-signals.

23. The method of claim 22, wherein the at least one isolated desired frequency component of the signals comprises an AC signal component of the signals.

24. The method of claim 23, further comprising determining another position deeper into the surface based on the calculating.

25. The method of claim 24, further comprising comparing the position to the other position to determine a penetration depth of the spot.

26. The method of claim 24, wherein the projecting comprises projecting the spot of light along the first axis onto the irregular surface, and wherein the method further comprises comparing the position to the other position to determine a penetration depth of the light.

27. The method of claim 1, wherein the projecting comprises projecting the spot of electromagnetic radiation along the first axis onto the irregular surface.

28. The method of claim 27, wherein the electromagnetic radiation comprises light.

29. The method of claim 27, wherein the electromagnetic radiation comprises laser light.

30. The method of claim 1, wherein the at least one isolated desired frequency component of the signals comprises multiple AC signal components of the signals.

31. The method of claim 30, further comprising selecting, from the multiple AC signal components, an AC signal component which best physically represents the surface.

32. The method of claim 30, wherein the multiple AC signal components of the signals comprise simultaneously produced multiple AC signal components of the signals.

33. The method of claim 31, wherein the selecting utilizes amplitude criteria.

34. The method of claim 30, further comprising selecting, from the multiple AC signal components, an AC signal component based on at least one of a speed of the surface and at least one optical property of the surface.

35. The method of claim 1, further comprising selecting, based on at least one of a speed of the surface and at least one optical property of the surface, the at least one isolated desired frequency component of the signals.

36. The method of claim 1, wherein the surface is arranged on a web and wherein the method further comprises determining a thickness of the web.

37. The method of claim 1, further comprising determining the position of the surface at various locations of the surface.

38. The method of claim 37, further comprising measuring positions of another surface opposite the surface in order to determine a thickness at various locations.

39. The method of claim 37, further comprising measuring, on a paper machine, positions of another surface opposite the surface in order to determine a thickness at various locations.

40. The method of claim 37, further comprising measuring positions of another surface opposite the surface online in order to determine a thickness at various locations.

41. The method of claim 1, further comprising measuring a position of another surface opposite the surface in order to determine a thickness.

42. The method of claim 1, further comprising producing information related to a property of the surface.

43. The method of claim 42, wherein the property comprises at least one of surface plasticization, surface roughness, surface gloss, coating quality, surface density, base paper density, mean distance between fibers, and an ash content of the surface.

44. The method of claim 1, wherein the calculating of the position of the irregular surface is also based on a DC signal component of the signals.

45. A method of measuring a position of an irregular surface, the method comprising:
projecting a spot along a first axis onto the irregular surface;
focusing an image of the spot along a second axis onto a detector, wherein the second axis is non-coaxially arranged with respect to the first axis;
processing signals from the detector; and
calculating the position of the irregular surface based on at least one isolated desired frequency component of the signals,
wherein the signals are AC-signals whose frequency generally corresponds to small-scale surface irregularities of the irregular surface.

46. A measuring device for determining a position of an irregular surface, the device comprising:
a device for producing electromagnetic radiation;
a device for projecting a spot along a first axis onto the irregular surface;
a detector;
a device for focusing an image of the spot along a second axis onto the detector, wherein the second axis is non-coaxially arranged with respect to the first axis; and
a device for processing signals from the detector,
wherein the measuring device is structured and arranged to calculate the position of the irregular surface based on at least one isolated desired frequency component of the signals.

47. The device of claim 46, wherein the signals are AC-signals whose frequency generally corresponds to small-scale surface irregularities of the irregular surface.

48. The device of claim 46, further comprising a window arranged between the surface and each of the device for producing electromagnetic radiation and the detector.

49. The device of claim 46, wherein the measurement device is arranged on a quality scanner located in a paper machine.

50. A method of determining a position of an uppermost portion of an irregular surface of a web relative to a reference position, the method cormprising:
producing a light;
focusing, with a first lens arrangement, the light into a tightly focused spot onto the irregular surface, wherein the first lens arrangement is oriented along a first axis;
focusing, with a second lens arrangement, a reflected image of the spot along a second axis onto detector elements of a detector, wherein the second axis is oriented at an angle with respect to the first axis;
preventing a substantial portion of the light reflected from a position beneath the uppermost portion of the surface from being focused onto the detector elements;
processing signals from the detector;
calculating the position of the uppermost portion of the irregular surface based on the signals and the reference position; and
at least one of displaying the position as a value, storing the position, and communicating the position to a processor.

51. The method of claim 50, wherein the signals are AC-signals whose frequency generally corresponds to small-scale surface irregularities of the irregular surface.

52. The method of claim 50, wherein the light comprises laser light.

53. The method of claim 50, further comprising:
simultaneously determining a position of an oppositely facing uppermost portion of another irregular surface of the web relative to a another reference position; and
calculating a thickness of the web based on the positions of the oppositely facing uppermost portions of the web.

54. The method of claim 50, wherein the simultaneously determining comprises:
producing another light;
focusing, with a third lens arrangement, the other light into a tightly focused spot onto the other irregular surface, wherein the third lens arrangement is oriented along a third axis;
focusing, with a fourth lens arrangement, a reflected image of the spot along a fourth axis onto detector elements of another detector, wherein the third axis is oriented at an angle with respect to the fourth axis;
preventing a substantial portion of the light reflected from a position beneath the oppositely facing uppermost portion from being focused onto the detector elements of the other detector;
processing signals from the other detector;
calculating the position of the oppositely facing uppermost portion of the other irregular surface based on the signals and the other reference position;
at least one of displaying the position as a value, storing the position, and communicating the position to a processor; and
determining a thickness of the web based on the positions of the oppositely facing uppermost portions of the web.

55. A method of determining a position of an uppermost portion of an irregular surface of a web relative to a reference position, the method comprising:

producing a beam of electromagnetic radiation;

focusing, with a first lens arrangement, the beam into a tightly focused spot onto the irregular surface, wherein the first lens arrangement is oriented along a first axis;

focusing, with a second lens arrangement, a reflected image of the spot along a second axis onto detector elements of a detector, wherein the second axis is oriented at an angle with respect to the first axis;

producing at least one signal based on a frequency analysis of the reflected image of the spot;

producing at least one other signal based on a frequency analysis of the reflected image of the spot;

comparing the at least one signal to the at least one other signal;

determining the position of the uppermost portion of the irregular surface based on the comparing and the reference position; and determining at least one other position beneath the uppermost portion of the irregular surface based on the comparing.

56. The method of claim 55, further comprising producing a value indicative of at least one property of the web.

57. The method of claim 55, wherein the at least one property comprises at least one of surface plasticization, surface roughness, surface gloss, coating quality, surface density, base paper density, mean distance between fibers, and an ash content of the surface.

58. The method of claim 55, further comprising generating the at least one signal based on a high frequency component of the reflected image of the spot.

59. The method of claim 55, further comprising generating the at least one signal based on an AC component of the reflected image of the spot.

60. The method of claim 55, wherein the web comprises a moving web.

\* \* \* \* \*